UNITED STATES PATENT OFFICE.

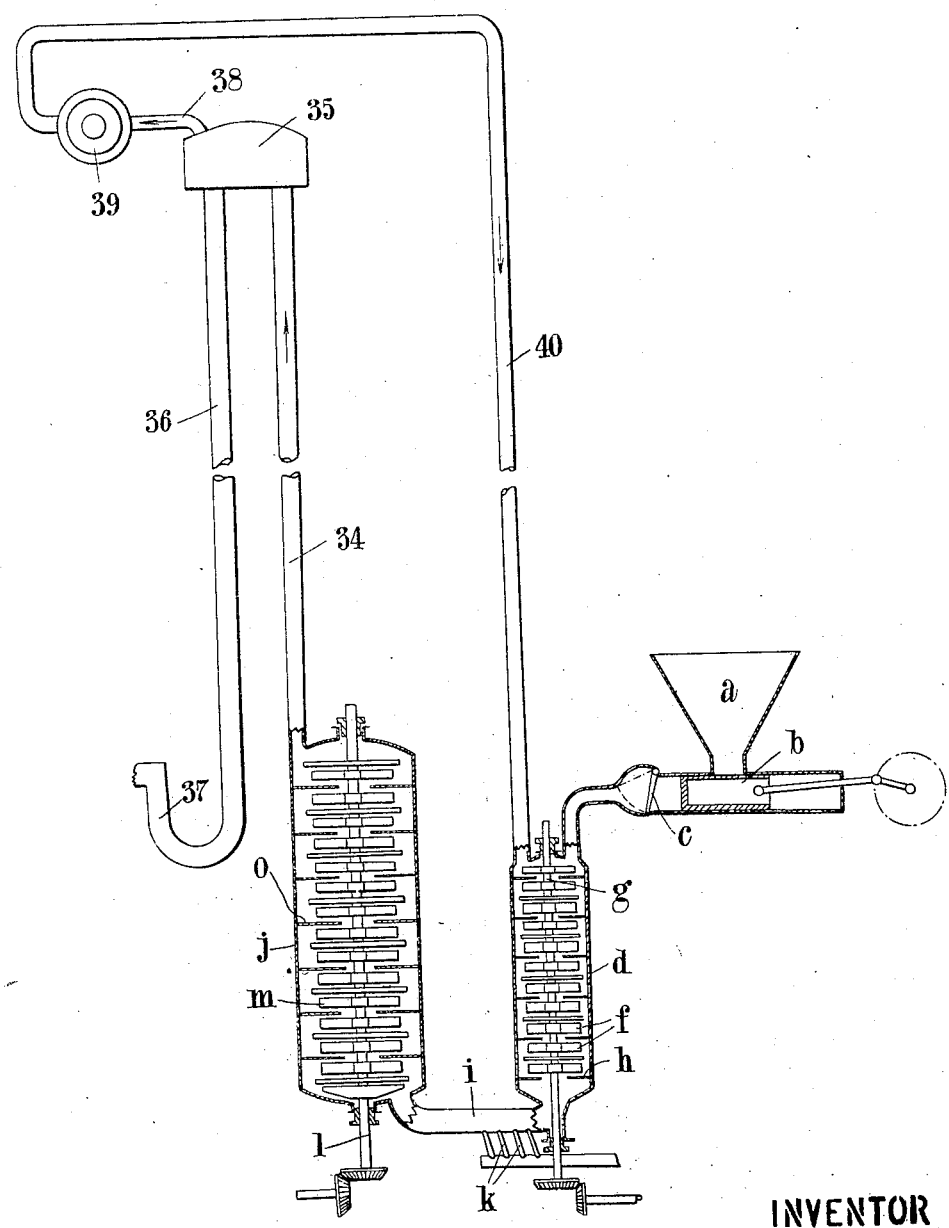

THOMAS RIGBY, OF DUMFRIES, SCOTLAND, ASSIGNOR TO WETCARBONIZING LIMITED, OF LONDON, ENGLAND.

TREATMENT OF PEAT.

1,251,422. Specification of Letters Patent. Patented Dec. 25, 1917.

Original application filed May 7, 1914, Serial No. 837,064. Divided and this application filed July 14, 1917. Serial No. 180,643.

*To all whom it may concern:*

Be it known that I, THOMAS RIGBY, a subject of the King of Great Britain and Ireland, and residing at 61 Loreburn street, Dumfries, Scotland, have invented certain new and useful Improvements in and Relating to the Treatment of Peat, of which the following is a specification.

This invention relates to the treatment of peat by processes of the type described in application, Serial No. 837064.

According to this invention, when effecting heat treatment of peat, transfer of heat from hot treated wet peat is effected by condensing water vapor generated by release of pressure or production of a partial vacuum, or in other similar manner.

The accompanying drawing shows diagrammatically an example in which recuperation is effected by vaporizing water from hot treated peat by reduction of superincumbent pressure and introduction of this vapor into the raw peat.

Where in the heat treatment of peat regeneration of heat from a material at a temperature above the atmospheric boiling point is desired, this may in certain cases with advantage be effected by releasing the pressure in one or a number of stages, and then recovering the heat of this steam by admixture of the same with cooler material, or by surface heating in appropriate heat exchanging devices. Such a principle can be extended to the recovery of the heat of a material below the normal boiling point by subjecting the material to reduced pressure and collecting the vapor and any fixed gases so evolved, and employing the same in the way indicated for heating cooler material, the energy consumption in the production of the partial vacuum and other energy losses to a large extent reappearing as heat in the evacuated products and being thus economized.

Such an arrangement is indicated in the drawing in which $a$ represents a hopper into which the raw material is delivered, and from which it is by a plunger device $b$ advanced through a flap valve $c$ to a mixer $d$ at the upper part of which it encounters vapor produced as hereinafter described. The mixing occurs under the influence of arms $f$ on a rotatable shaft $g$ and baffles $h$. The material passes from the mixer $d$ through a pipe $i$ to a vessel $j$, it receiving on the way a sufficiency of steam from nozzles $k$ to complete the raising of its temperature. The vessel $j$, in passing through which the material is maintained at or about the maximum working temperature, is also provided with a rotatable shaft $l$ and paddles $m$, as also baffles $o$, adapted to secure proper distribution of the heat and nevertheless (as also the paddles $g$ and baffles $h$) designed to avoid undue maceration.

The peat leaves the vessel $j$ by a pipe 34, connected to a vessel 35, also provided with a pipe 36 sealed at its base by a bend 37, the pipes 34 and 36 being of such length as to act as barometric seals. The vessel 35 has a pipe 38 connected to a turbine exhauster 39, evacuating the vessel 35, and introducing by the pipe 40 the vapor so generated into the stream of peat continuously flowing into the vessel $d$.

Having now described my invention, what I claim as new and desire to secure by Letters Patent is:—

1. A method of rendering the water of peat more freely expressible, consisting in heating the peat while preventing evaporation in order to destroy its water binding properties, reducing the pressure above the peat thus treated, and utilizing the vapors thereby evolved to preheat the peat about to be treated.

2. A method of economizing heat in the treatment of peat in tubular heating apparatus, through which it is continuously passed while being heated without evaporation in order to destroy its water binding properties, consisting in reducing the pressure above the hot peat in an independent stage of the continuous process, and passing the warm vapor thereby evolved into contact with untreated peat in order to preheat the latter.

3. A method of economizing heat in the treatment of peat effected by raising its temperature under pressure sufficient to prevent evaporation, consisting in extracting heat from the product of the treatment by means of vapor generated upon a reduction of pressure, and imparting to the material about to be treated the heat thus extracted.

4. A method of economizing heat in the treatment of peat effected by raising its temperature under pressure sufficient to prevent evaporation, consisting in creating said pressure by means of an upright conduit up which the peat is discharged from the vessel in which it is treated, collecting the vapor evolved from the peat at the reduced pressure existing at the top of said conduit and delivering said vapor into the peat about to undergo treatment.

In testimony whereof I have signed my name to this specification.

THOMAS RIGBY.

Copies of this patent may be obtained for five cents each, by addressing the "Commissioner of Patents, Washington, D. C."